United States Patent [19]

Furukawa et al.

[11] Patent Number: 5,332,143
[45] Date of Patent: Jul. 26, 1994

[54] SELF-PROPELLING APPARATUS FOR AUTOMATIC HORIZONTAL POSITION WELDING OF BIG SIZE SQUARE STEEL COLUMN

[75] Inventors: Kazutoshi Furukawa; Keiji Ono, both of Tokyo, Japan

[73] Assignee: Aichi Sangyo Co., Ltd., Tokyo, Japan

[21] Appl. No.: 107,243

[22] Filed: Aug. 16, 1993

[30] Foreign Application Priority Data

Aug. 25, 1992 [JP] Japan .................................. 4-247214

[51] Int. Cl.⁵ .............................................. B23K 37/02
[52] U.S. Cl. ........................................... 228/8; 228/45; 219/124.31
[58] Field of Search .................... 228/8, 25, 28, 45; 219/124.22, 124.31

[56] References Cited

U.S. PATENT DOCUMENTS 3,920,946 11/1975 Takahashi et al. ............... 228/45
4,577,089 3/1986 Olson .................................. 228/48

FOREIGN PATENT DOCUMENTS 58-112696 7/1983 Japan .
58-184100 10/1983 Japan .
60-247472 12/1985 Japan .
63-090396 4/1988 Japan .
05023853 2/1993 Japan .

*Primary Examiner*—Samuel M. Heinrich
*Attorney, Agent, or Firm*—Price, Heneveld, Cooper, DeWitt & Litton

[57] ABSTRACT

A self-propelling apparatus, suitable for use in automatic horizontal position welding of a large-sized square steel column such as architectural steel column, has a welder unit, travelling rollers and a seam tracking device. The travelling rollers are magnet-based rollers (1, 1') which are so arranged to hold the upper surface of the steel column and are mounted on a mounting plate (7). The mounting plate (7) is connected to the seam tracking device (6) through a rotational pivot (8) which is preloaded by a spring (9). The spacing between the travelling magnet rollers (1, 1') preferably ranges between 100 and 200 mm.

2 Claims, 4 Drawing Sheets

SELF-PROPELLING APPARATUS FOR AUTOMATIC HORIZONTAL POSITION WELDING OF BIG SIZE SQUARE STEEL COLUMN

BACKGROUND OF THE INVENTION

The present invention broadly relates to automatic welding of a square steel column having a large cross section and, more particularly, to a self-propelling apparatus for automatic welding which runs along the surface of the column so as to secure a constant welding speed over the entire welding line including straight side portions and radiused corner portions (referred to as "R portion", hereinafter).

Construction of a building with steel reinforcements with square steel columns (referred to as "square column", hereinafter) generally requires horizontal position welding of the square columns. Such welding is usually conducted in the form of multi-layers welding, using a semi-automatic welding apparatus of gas shielded metal arc type or self-shielded arc type.

However, the use of such a semi-automatic welding apparatus requires workers having high levels of skill and experience. In recent years, a serious problem has been posed because there is a shortage of such skilled workers and because existing skilled workers are getting old. Under this circumstance, there has been an increasing demand for full automation of welding of the kind described.

A known automatic welding system employed in this type of welding is aided by a computer which controls the welding speed such that a constant welding speed is maintained over the entire welding path including straight and R portions of the square column.

This known automatic welding system is very large in size and is costly. In addition, an impractically long time is required for training the operators who will use this welding system. This automatic welding system, therefore, could hardly be put to practical use.

In order to obviate this problem, the present applicant filed a patent application on an invention under the title of "WELDING SPEED CONTROL DEVICE FOR WELDING RADIUSED CORNER PORTION OF LARGE-SIZED SQUARE STEEL COLUMN", on the date of Jul. 22, 1991, as Japanese Patent Application No. 3-271738.

The welding speed control device of the above-mentioned patent application has a combination of a limit switch installed on a truck or a carriage which runs along a rail and a limit switch actuator which is installed at a preset position along the trail.

More specifically, the welding speed control device has a limit switch actuator installed at a position along the rail and a limit switch attached to a carriage, wherein the limit switch actuator and the limit switch cooperate with each other so as to enable controlling of the welding speed such way that the welding is conducted at a speed $V_1$ in the region between a point A and a point B and, in the region between a point D and a point E, at a speed $V_2$ higher than the speed $V_1$, then the welding speed being then lowered again to $V_1$ as the welding passes the point E. Consequently, horizontal weld joint of a square column can be made smoothly and continuously over the entire seam path, i.e., from a straight portion to an R portion and then to the next straight portion.

This welding speed control device, however, has disadvantages in that the device itself is expensive and is rather difficult to operate.

SUMMARY OF THE INVENTION

Accordingly, an object of the present invention is to provide an inexpensive and easy-to-operate self-propelling apparatus for use in automatic welding a horizontal position joint of square column.

To this end, according to the present invention, there is provided a self-propelling apparatus for use in automatic horizontal position welding of a large-sized square steel column, comprising: a welder unit, travelling rollers and a seam tracking device, wherein the travelling rollers are magnet-based rollers which are arranged so as to hold the upper surface of the steel column and are mounted on a mounting plate, the mounting plate being connected to the seam tracking device through a rotational pivot which is spring-loaded.

Preferably, the spacing between the propelling magnet rollers ranges between 100 mm and 200 mm.

According to the invention, the self-propelling apparatus hardly comes off the column because the apparatus itself is constructed to cling to the upper surface of the square column and because the propelling rollers are magnet-based rollers. In addition, the welding speed is exactly the same as the speed of movement of the whole apparatus, which makes it possible to easily perform the welding.

The apparatus is held on the surface of the square column by the attracting force of the magnet and the force produced by the seam tracking device. When the welding unit of the welding apparatus passes an R portion, a relative angle between a mounting plate carrying the pair of travelling rollers and the seam tracking apparatus changes. It is therefore necessary to keep the apparatus even facing perpendicular to surface being welded, and thus to connect the mounting plate to the seam tracking device through a rotational pivot and to preload the pivot by a spring.

According to the present invention, the spacing between the pair of magnet rollers is preferably set to range between 100 and 200 mm. When the spacing is smaller than 100 mm, it is difficult to keep the travelling magnet rollers in contact with the surface of the square column during travel of the welding apparatus due to resistance posed by the wheels of the seam tracking device. Conversely, in case magnet rollers spacing exceeds 200 mm, it undesirably increases the later-mentioned clearance margin between the travelling magnet rollers, as well as the sizes of the seam tracking device and the size of the welding torch tracking device, with the result that the size of the apparatus is increased impractically.

The above and other objects, features and advantages of the present invention will become clear from the following description of the preferred embodiment when the same is read in conjunction with the accompanying drawings.

DETAILED DESCRIPTION OF THE PREFERRED EMBODIMENT

Figure 1:
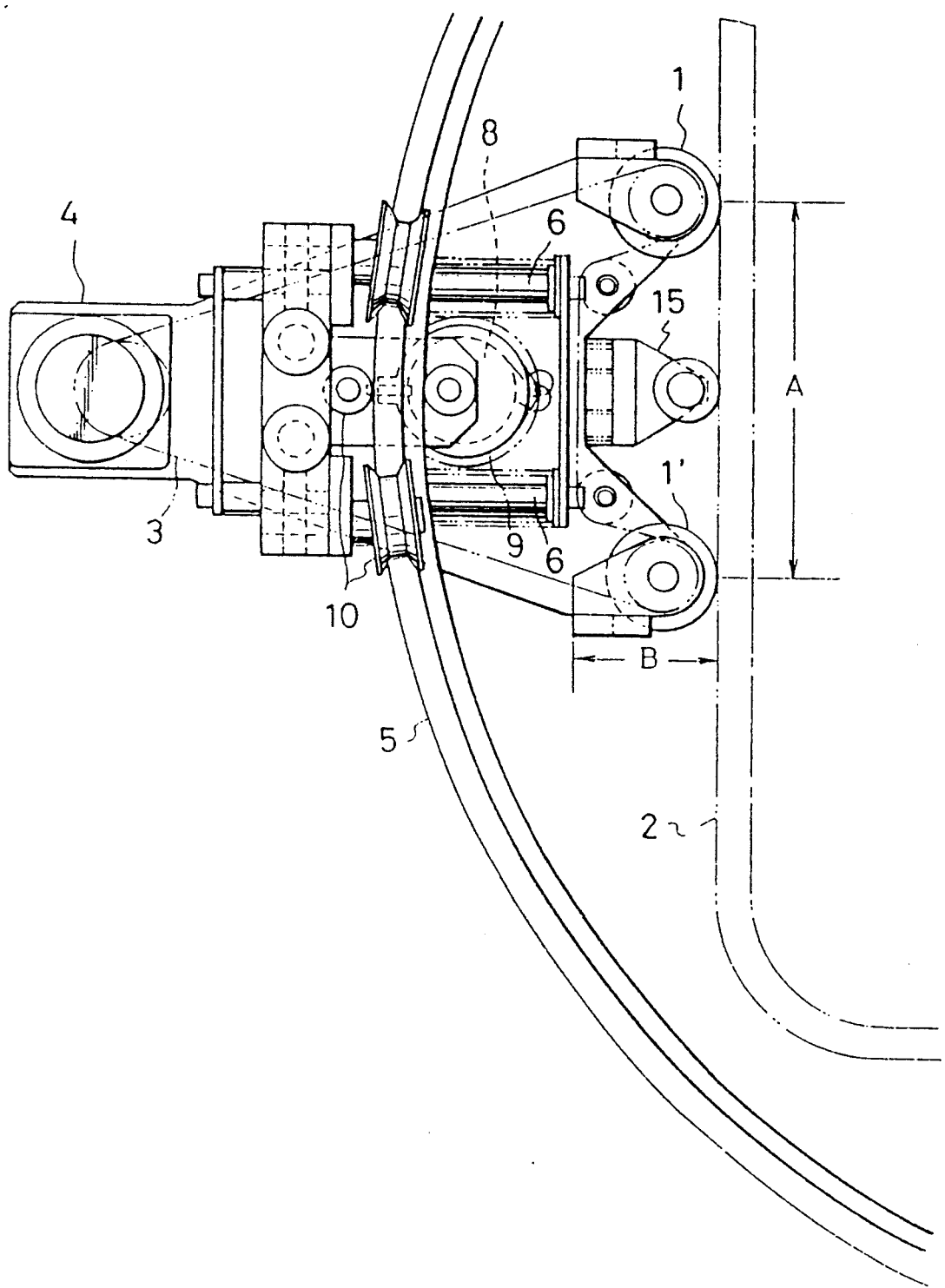
FIG. 1 is a plan view of an apparatus embodying the present invention.

Referring to FIG. 1, a welding apparatus of the present invention has travelling magnet rollers 1, 1' which are magnetically held in contact with the upper surface of a square column 2. These travelling magnet rollers 1, 1' are driven by a driving motor 4 through driving belts 3 so as to produce propelling force for driving the whole apparatus along a weld path.

The apparatus also has a seam tracking device 6 having wheels 10 adapted to run on a circular rail 5, so as to position and hold the whole apparatus at predetermined positions. Thus, the wheels 10 idle on the circular rail 5 during travel of the apparatus by the propelling force exerted by the travelling magnet rollers 1, 1'.

The spacing "A" between the travelling magnet rollers 1, 1' is preferably and effectively determined to range between 100 mm and 200 mm. Any spacing between these rollers 1, 1' below 100 mm hampers smooth travel of the apparatus, while any spacing exceeding 200 mm requires a large clearance margin "B", with the result that the size of the apparatus is impractically increased.

Figure 2:
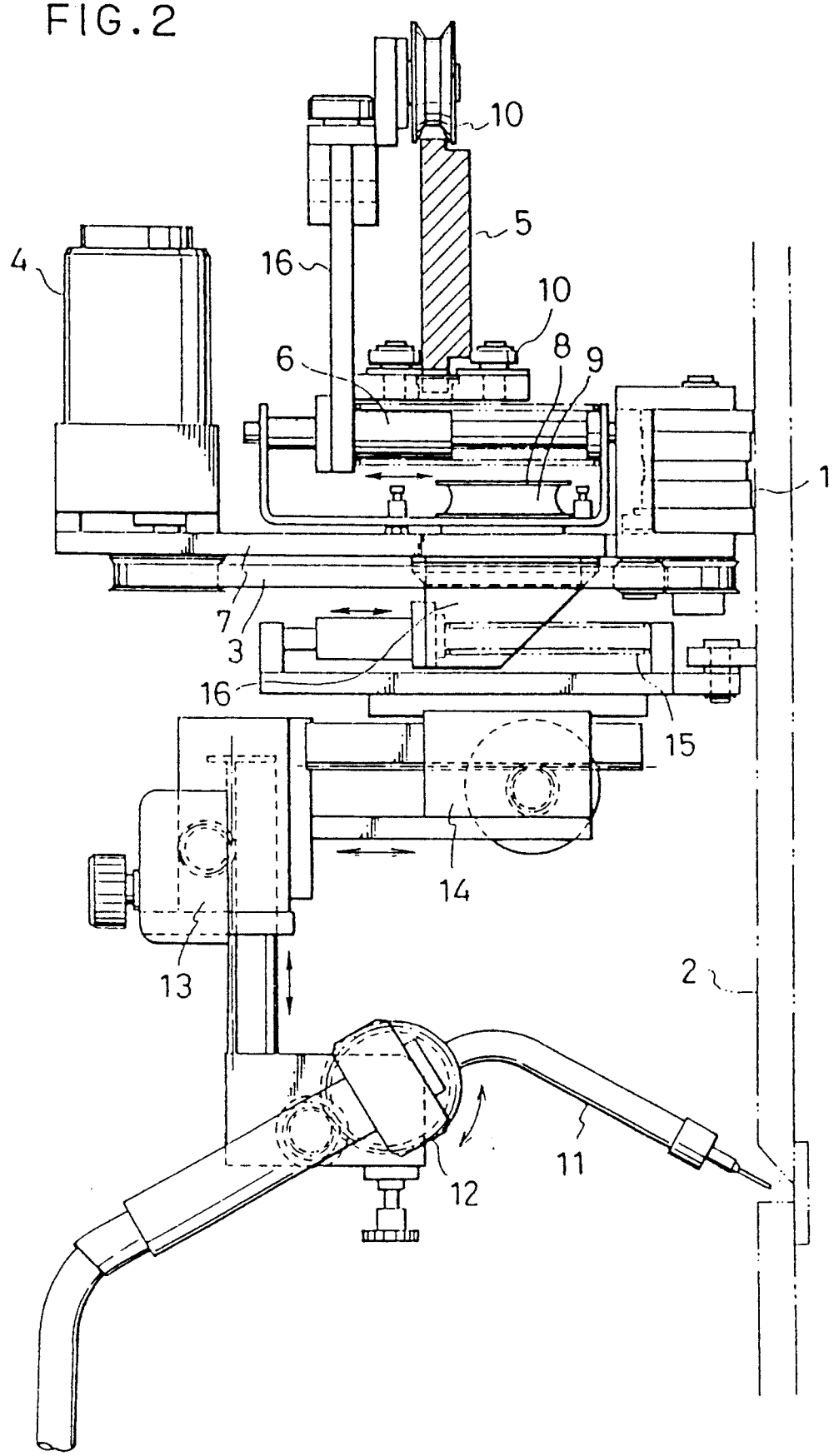
FIG. 2 is a side elevational view of the embodiment set in a circular rail.

Referring to FIG. 2, a truck runs along the circular rail 5 secured to the square column 2. Since the distance between the upper surface of the square column 2 and the circular rail 5 varies according to the position, a seam tracking device 6 always presses the magnet rollers 1, 1' into contact with the upper surface of the square column 2, thereby ensuring stable running. The square column 2 should have a nature to magnetically attract and hold the travelling magnet roller 1, 1', e.g., an architectural steel reinforcement column.

A welding torch 11 must be held at a constant distance from the weld portion, i.e., end-prepped joint of the square column 2, in order to obtain good quality of the weld. To this end, the welding torch 11 is secured to the welding torch tracking device 15 through a welding torch angle adjusting device 12, a welding torch vertical adjusting device 13 and a welding torch lateral adjusting device 14 for adjusting the torch position in forward and backward direction. The welding torch tracking device 15 is fixed by means of a bracket 16 to mounting plate 7 (see FIGS. 3 and 4) so that a constant distance is maintained between the welding torch 11 and the seam joint of the square column 2.

Figure 3:
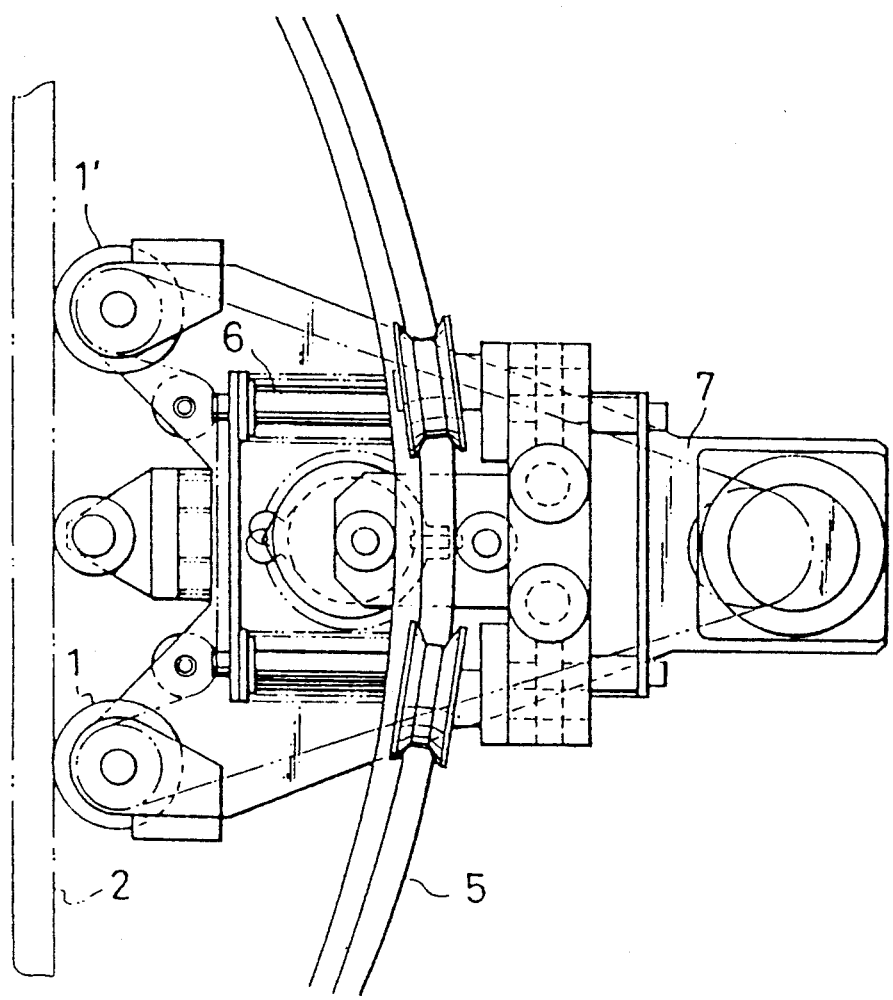
FIG. 3 is a plan view of the embodiment in a state in which a truck of the apparatus is on a straight portion of weld joint of a square column.
Figure 4:
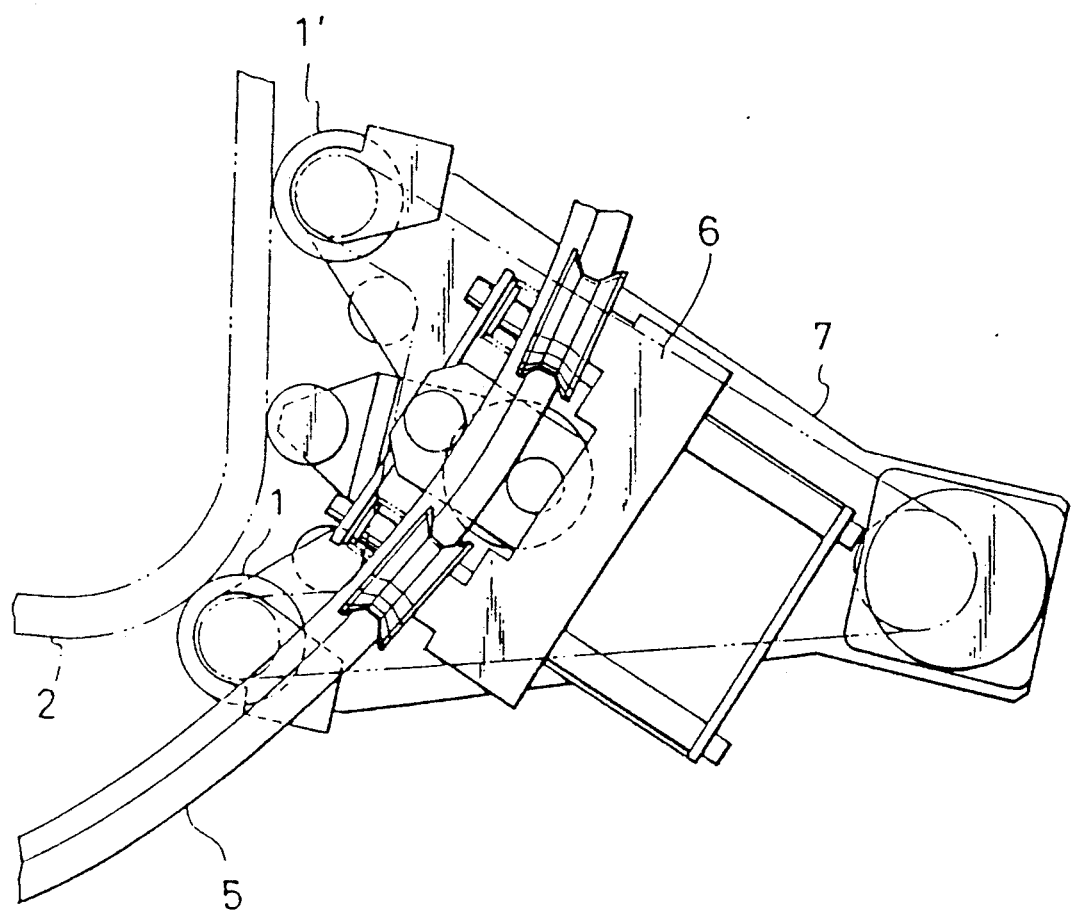
FIG. 4 is a plan view of the embodiment in a state in which the truck is on an R portion of the weld joint.

When the truck moves from a straight portion of the weld path on the square column 2 to the R portion, the relative angle formed between the seam tracking device 6 and the mounting plate 7 carrying a pair of running magnet rollers 1, 1' changes from the state shown in FIG. 3 to the state shown in FIG. 4. In order to accommodate such a change in the relative angle between the mounting plate 7 and the seam tracking device 6, the mounting plate 7, which also carries the driving motor 4, is connected through a pivot 8 to the seam tracking device 6, so as to allow the mounting plate 7 to freely swivel with respect to the seam tracking device 6. In addition, a spring 9 attached to the pivot 8 serves to preload the mounting plate 7 always to revert to the original position.

As will be understood from the foregoing description, the present invention provides a self-propelling apparatus for automatic horizontal position welding of a square column, which can be produced at a low cost and which is very easy to operate. The apparatus of the present invention can allow welding at a constant speed over the entire weld path including straight and radiused corner portions of the weld joint, thus ensuring smooth welding operation and high quality of weld joint.

Although the invention has been described through its specific form, it is to be understood that the described embodiment is only illustrative and various changes and modifications may be imparted thereto without departing from the scope of the invention which is limited solely by the appended claims.

The embodiments of the invention in which an exclusive property or privilege is claimed are defined as follows:

1. A self-propelling apparatus for automatic horizontal position welding of a large-sized square steel column, comprising:
    a welder unit, travelling rollers and a seam tracking device, wherein said travelling rollers are magnet-based rollers (1, 1') which are arranged so as to hold the upper surface of said steel column and are mounted on a mounting plate (7), said mounting plate (7) being connected to said seam tracking device (6) through a rotational pivot (8) which is preloaded by a spring (9).

2. A self-propelling apparatus for automatic welding according to claim 1, wherein the spacing between said magnet rollers (1, 1') ranges from 100 to 200 mm.

* * * * *